(12) United States Patent
Suzuki et al.

(10) Patent No.: US 7,787,027 B2
(45) Date of Patent: *Aug. 31, 2010

(54) INFORMATION INPUT APPARATUS AND METHOD

(75) Inventors: Masahiro Suzuki, Inzai (JP); Fumio Hiraide, Ebina (JP); Toshihisa Kuroiwa, Miura (JP); Yoji Uchiyama, Yokohama (JP); Akira Ohmura, Kawasaki (JP)

(73) Assignee: Nikon Corporation, Tokyo (JP)

( * ) Notice: Subject to any disclaimer, the term of this patent is extended or adjusted under 35 U.S.C. 154(b) by 1328 days.

This patent is subject to a terminal disclaimer.

(21) Appl. No.: 11/167,257

(22) Filed: Jun. 28, 2005

(65) Prior Publication Data
US 2005/0231612 A1  Oct. 20, 2005

Related U.S. Application Data

(62) Division of application No. 08/859,276, filed on May 20, 1997, now abandoned.

(30) Foreign Application Priority Data
Jun. 13, 1996  (JP) .................................. 08-152221

(51) Int. Cl.
H04N 5/76 (2006.01)
H04N 5/225 (2006.01)

(52) U.S. Cl. .............................. 348/231.99; 348/231.4; 348/207.99

(58) Field of Classification Search .............. 348/231.4, 348/231.6, 231.9
See application file for complete search history.

(56) References Cited

U.S. PATENT DOCUMENTS

| 4,223,987 | A |   | 9/1980  | Shimizu et al. |
|-----------|---|---|---------|----------------|
| 4,660,102 | A |   | 4/1987  | Kawakami et al. |
| 4,937,673 | A |   | 6/1990  | Saito et al. |
| 4,983,996 | A |   | 1/1991  | Kinoshita |
| 5,099,262 | A |   | 3/1992  | Tanaka et al. |
| 5,576,758 | A |   | 11/1996 | Arai et al. |
| 5,784,525 | A | * | 7/1998  | Bell ........................... 386/107 |
| 5,815,201 | A |   | 9/1998  | Hashimoto et al. |
| RE36,338  | E | * | 10/1999 | Fukuoka .................. 348/231.4 |
| 5,966,495 | A | * | 10/1999 | Takahashi et al. ............. 386/68 |
| 6,031,915 | A | * | 2/2000  | Okano et al. ................. 381/56 |

OTHER PUBLICATIONS

Copending U.S. Appl. No. 11/327,320, filed Jan. 9, 2006.*

* cited by examiner

*Primary Examiner*—Luong T Nguyen
(74) *Attorney, Agent, or Firm*—Oliff & Berridge, PLC

(57) ABSTRACT

An electronic camera is capable of recording image, voice, text, line-drawn information and the like. A release switch in the electronic camera is operated to photograph a subject image. When recording voice with the electronic camera, shutter sound effects are not output with the recorded voice. Further, the photographic operation can be indicated to the user by lighting a light-emitting diode in a finder when the release switch is operated.

8 Claims, 13 Drawing Sheets

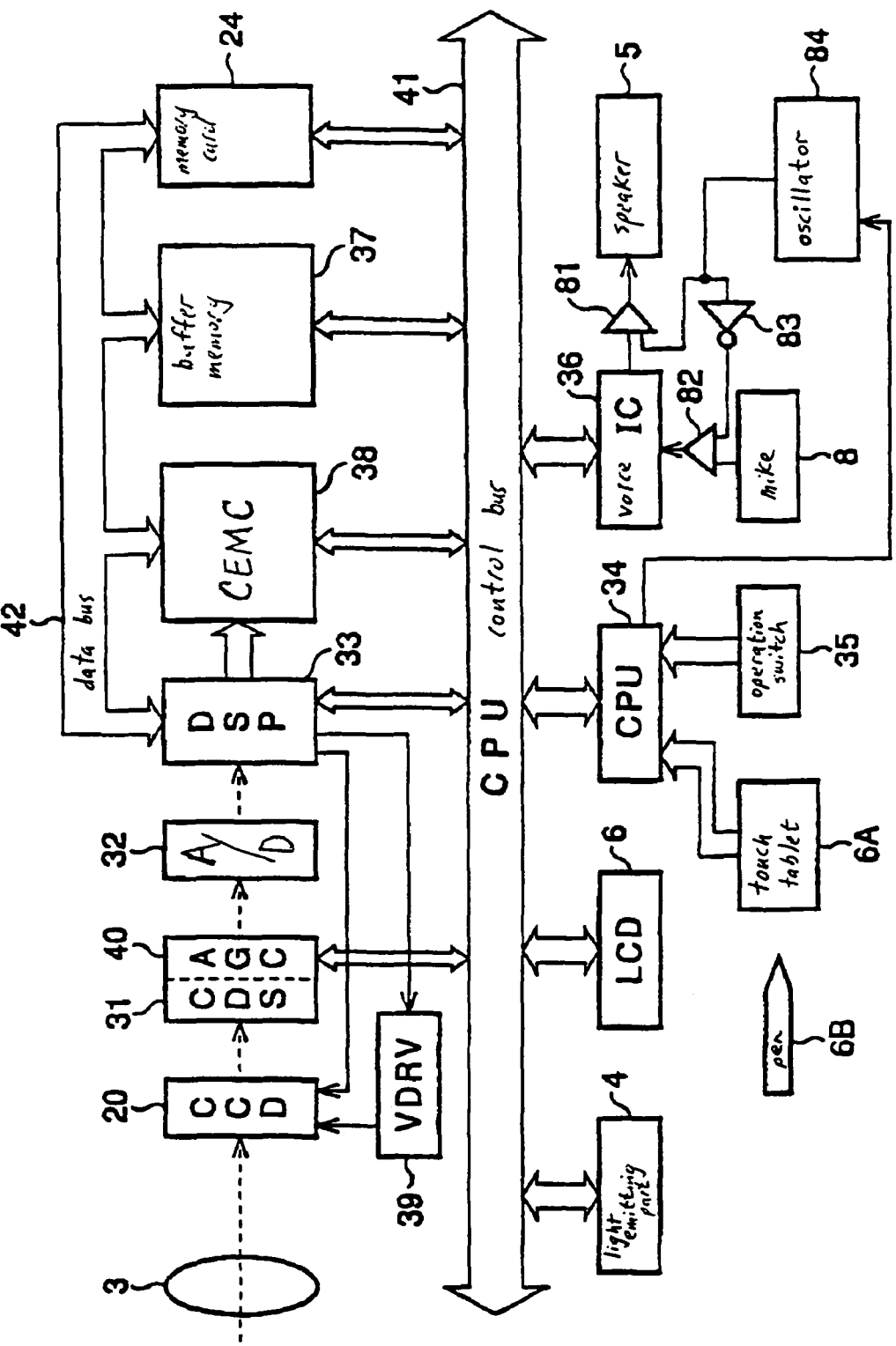

INFORMATION INPUT APPARATUS AND METHOD

This is a Division of application Ser. No. 08/859,276 filed May 20, 1997. The entire disclosure of the prior application is hereby incorporated by reference herein in its entirety.

BACKGROUND OF THE INVENTION

1. Field of Invention

The invention relates to an information input apparatus used in an electronic camera and the like to convert subject images into digital data. The information input apparatus then records the digital data.

2. Description of Related Art

Instead of cameras that use film, electronic cameras can be used to photograph the subject image using a CCD or the like, convert this into digital data, and record it in an installed memory or in an attachable/detachable memory card, or the like. With the image photographed using these electronic cameras, there is no need to go through the developing and printing necessary in conventional film cameras. In addition, immediate playback or display on a screen such as an LCD, are possible.

Further, to record the photographed image as digital data, the electronic camera input apparatus have become compatible with personal computers. For example, to create an Internet home page, electronic cameras can be used to input such image data. Electronic camera input apparatus that input not only images, but also voice and sound recording (capability) have been considered.

In an electronic camera that has image and sound recording (e.g., voice) capability, the release button can be operated during voice recording. This can cause the problem that the shutter sound effect output when the release button is operated is recorded as well.

SUMMARY OF THE INVENTION

It is an object of the present invention to solve at least the above-identified problems. It is another object of the present invention to prevent a sound effect such as a shutter sound effect from being output during voice recording so that only necessary information is recorded.

The information input apparatus of the invention includes an imaging device for imaging a prescribed subject image, a voice input device inputting a prescribed voice, a storage device for storing image data, voice data or the like, a pointing device indicating a start of a prescribed process, a sound effect output device that can output a prescribed sound effect, and a control device. The sound effect can be a shutter sound effect or the like. When the voice input device is recording, the control device can control the sound effect output device so that sound effects are not output during operation of the pointing device.

Further, the information input apparatus includes an observation device for observing the subject and an information output device for outputting visual information within the observation device. The pointing device can be a release button that indicates a start of a photographic process where the image imaged by the imaging device is stored in the storage device. The control device can control visual information output by the information output device within the observation device to indicate when the pointing device is operated.

The information input apparatus can further include a photographic setting device that determines a photographic environment. When the pointing device is operated, the sound effect output device then outputs a sound effect corresponding to the photographic environment set by the setting device. As a result, the sound effect is altered based on the photographic environment. Accordingly, the user can confirm the photographic environment from the sound effect, which improves the operations of the information input apparatus. The sound effect output device can also output sound effects corresponding to an operation mode of the apparatus set by the photographic setting device when the pointing device is operated. As a result, the sound effect is altered based on the operation mode. Accordingly, the user can confirm the operation mode from the sound effect, which improves operations of the information input apparatus.

The information input apparatus can further include a sound effect silencing device and a voice playback device. The sound effect silencing device can silence all or part of a sound effect when a voice played back by the voice playback device includes the sound effect. Thus, when the recorded voice is output, the sound effect previously included can be silenced. Accordingly, the information input apparatus does not output unnecessary information.

The information input apparatus can include a deleting device that deletes all or part of a sound effect from the voice recording when the sound effect output by the sound effect output device is included with the voice input by the voice input device. Thus, the deleting device can prevent recording the sound effect. Alternatively, the sound effect output device can output sound effects of a frequency outside an input range of the voice input device, outside a storage range of the storage device, or outside a playback range of the voice playback device. Accordingly, the information input apparatus does not record the potentially unnecessary information of the sound effect.

Other objects, advantages and salient features of the invention will become apparent from the detailed description taken in conjunction with the annexed drawings, which illustrate preferred embodiments of the invention.

BRIEF DESCRIPTION OF THE DRAWINGS

The invention will be described with reference to the following drawings in which like reference numerals refer to like elements and wherein:

FIG. 19 is a block diagram showing yet another electrical composition of the electronic camera according to the present invention.

DETAILED DESCRIPTION OF PREFERRED EMBODIMENTS

Figure 1:
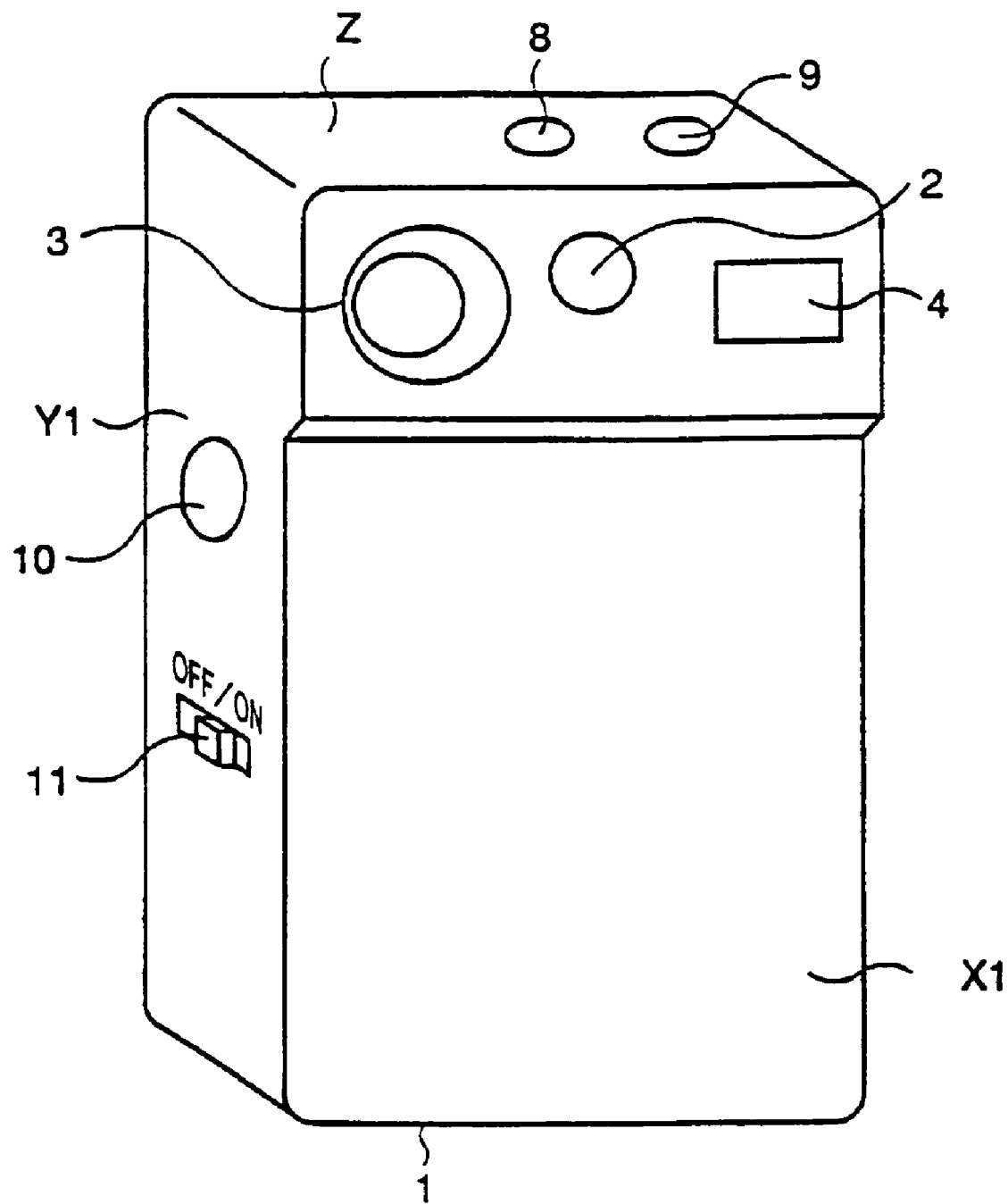
FIG. 1 shows a front perspective view of one embodiment of the present invention applied to an electronic camera.
Figure 2:
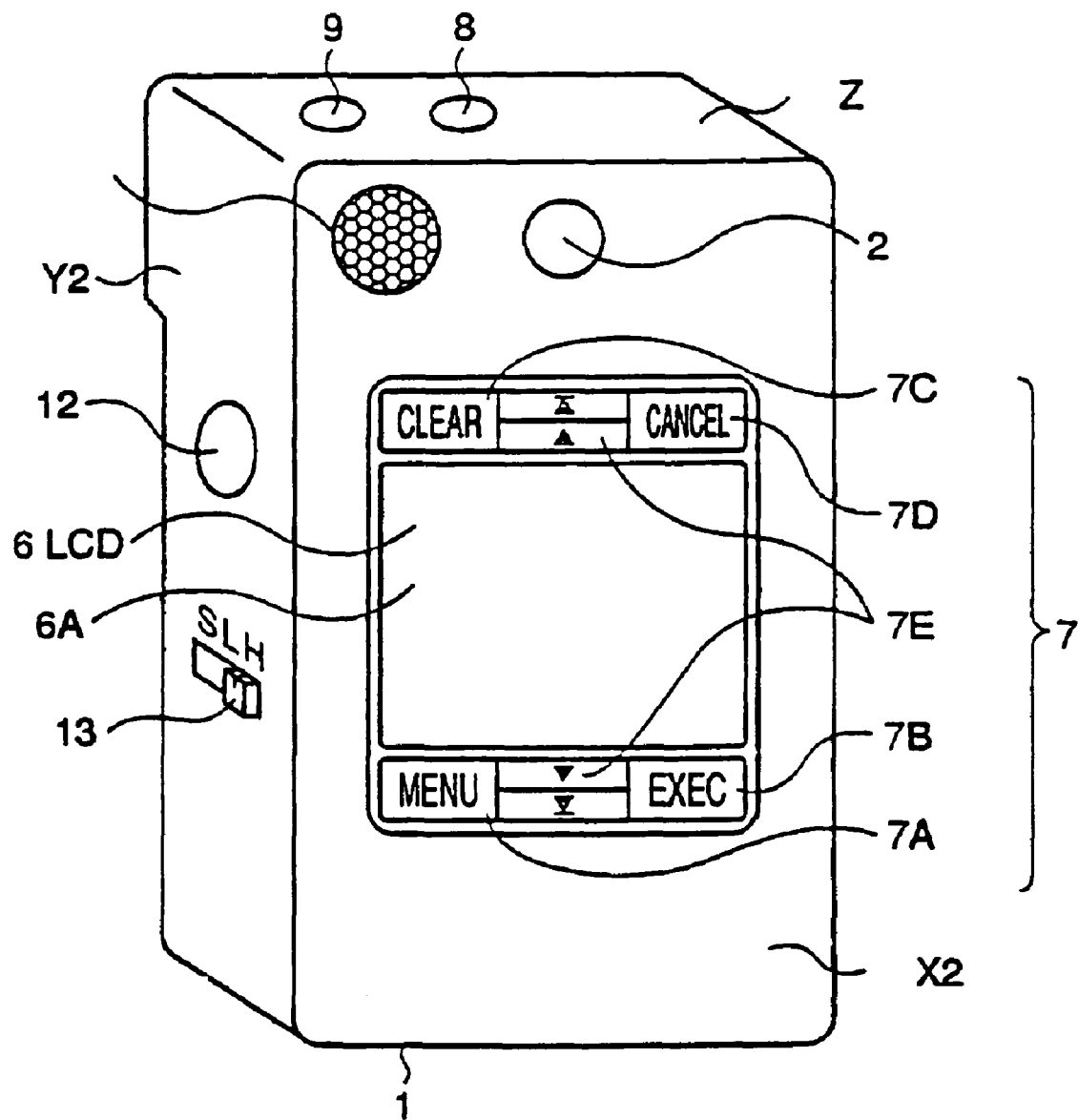
FIG. 2 shows a rear perspective view of the electronic camera of FIG. 1.

FIGS. 1 and 2 are perspective views of one embodiment of an electronic camera 1 to which the present invention is applied. For convenience of description, there are six surfaces composing the electronic camera 1 A surface facing a subject when the electronic camera 1 is photographing the subject is called surface X1. The surface facing the user is called surface X2 as shown in FIG. 2. At the upper end of the surface X1, a finder 2 confirms the photographic range of the subject, a photographic lens 3 takes in the light image of the subject and a light-emitting part (e.g., strobe) 4 emits light to illuminate the subject.

Figure 11:
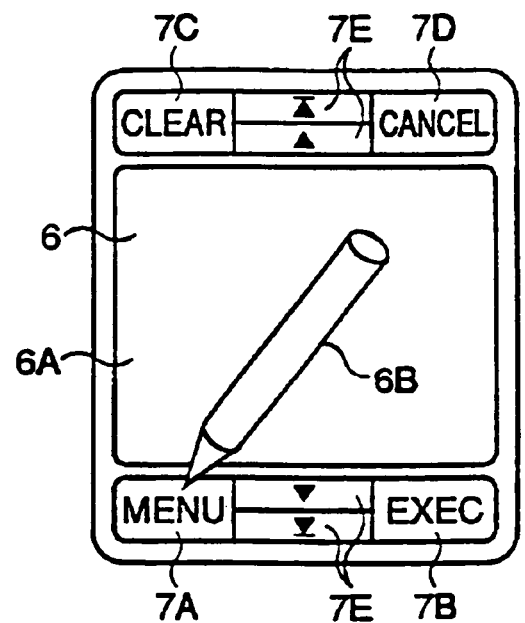
FIG. 11 shows an electronic camera using a pen and a menu key.

At the top end of the surface X2, which opposes the surface X1, the finder 2 and a speaker 5 are provided. The speaker 5 outputs sound (e.g., voice or the like) corresponding to sound data recorded in a memory card or the like installed in the electronic camera 1. As shown in FIG. 2, an LCD 6 and an operating keys 7 are formed on the surface X2 vertically below the finder 2, the photographic lens 3, the light-emitting part 4, and the speaker 5. On the surface of the LCD 6 is a touch tablet 6A. A pen-type pointing device (hereafter "pen") 6B or the like can contact the touch tablet 6A to make selections or input data as shown in FIG. 11.

The touch tablet 6A is composed of translucent material such as glass or resin. The user can observe the image displayed on the LCD 6 inside of the touch tablet 6A through the touch tablet 6A.

The operating keys 7 includes a plurality of keys corresponding to various functions and is operated by the pen 6B. Recorded data such as image data, voice data, or text data, recorded in the memory card can be played back by being displayed on the LCD 6. For example, a menu key 7A is operated when a menu screen is displayed on the LCD 6. An execute key 7B is operated when playing back the recorded data selected by the user.

Further, a clear key 7C is operated when deleting recorded data. A cancel key 7D is operated to interrupt the replay process of the recorded data. When a list of the recorded data is displayed on the LCD 6, a scroll key 7E is operated to scroll in a vertical direction on the screen.

On a top surface Z of the electronic camera 1 are a voice collection microphone (mike) 8 and an earphone jack 9 for connection to earphones (not shown).

On a side surface Y1 are a release switch or release button 10 and a power source (ON/OFF) switch 11. The release switch 10 is operated to photograph the subject. The release switch 10 and the power source switch 11 are arranged vertically below the finder 2, the photographic lens 3 and the light-emitting part 4.

On a side surface Y2 are a recording switch 12 that is operated during sound recording and a continuous shooting mode changeover switch 13 that is operated to change to continuous shooting mode during photography. The side surface Y2 is opposite the side surface Y1. The recording switch 12 and the continuous shooting mode changeover switch 13 are located vertically below the finder 2, the photographic lens 3, and the light-emitting part 4. The recording switch 12 is approximately the same height as the release switch 10 on the surface Y1 so that in whichever hand the user holds the electronic camera 1, there is no incongruity.

The heights of the release switch 10 and the recording switch 12 can be made different, for example, if a switch on only one of the sides is to pressed by a finger. If the switches are positioned differently on the opposite sides, it is possible to press one switch while at the same time also holding the opposing side surface with an opposing finger.

When the user presses the release switch 10 and photographs the subject, the continuous shooting mode changeover switch 13 controls whether the subject is photographed only in one frame or photographed continuously in a preset plurality of frames. For example, if the indicator of the continuous shooting mode changeover switch changes to the position "S" (the "S" mode) when the release switch 10 is pressed, photography is performed only for one frame.

If the continuous shooting mode changeover switch 13 is at the position "L" (the "L" mode) when the release switch 10 is pressed, photography is performed at a rate of 8 frames per second. That is, photography is performed by a low speed continuous shooting mode. If the indicator of the continuous shooting mode changeover switch is at the position "H" (the "H" mode) when the release switch 10 is pressed, photography is performed at a rate of 30 frames per second. That is, photography is performed in the high speed continuous shooting mode.

Figure 3:
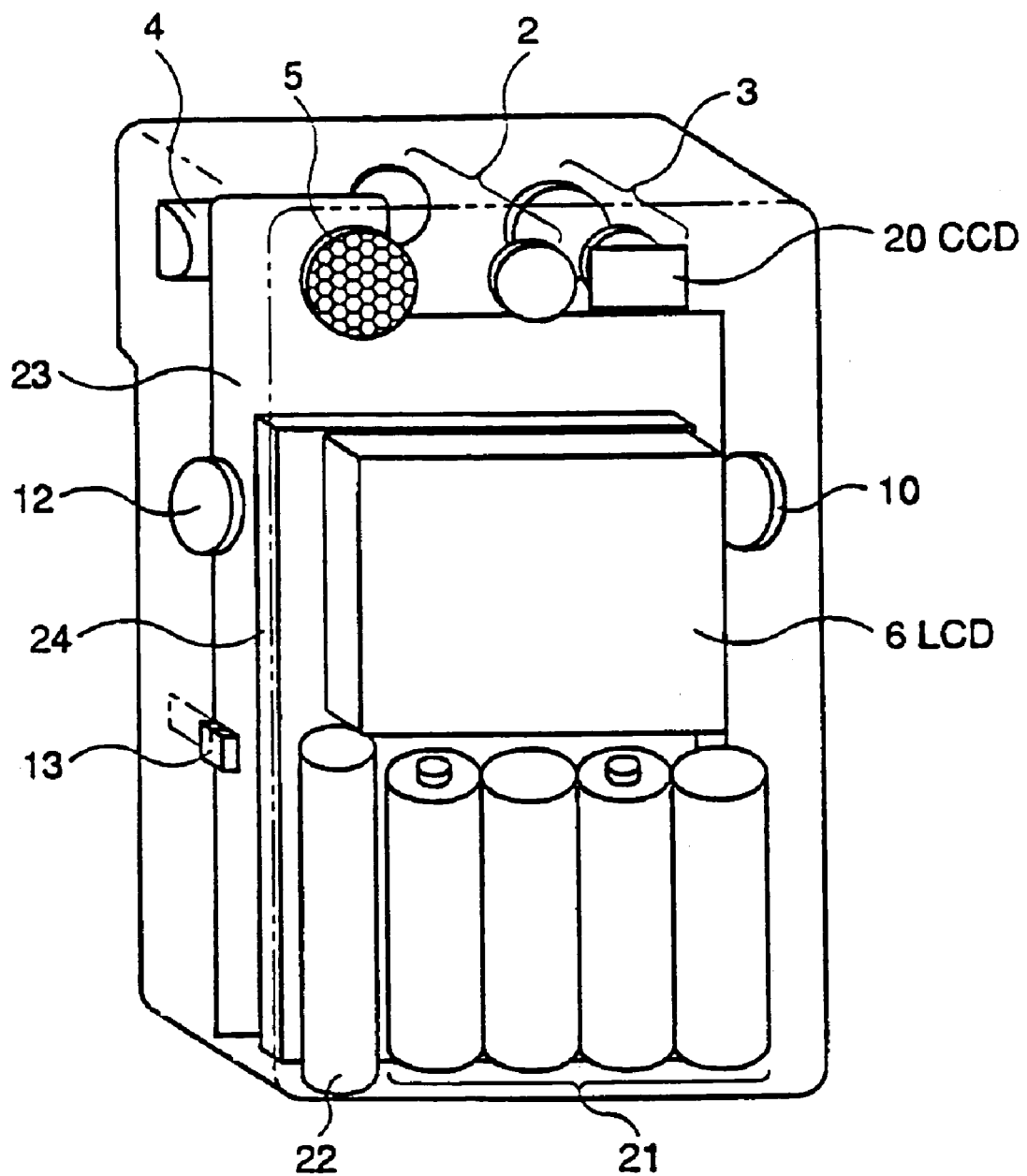
FIG. 3 shows a portion of the electronic camera of FIG. 1.

Next, composition of a portion of the interior of the electronic camera 1 is explained with respect to FIG. 3. A CCD 20 is behind (the surface X2 side) the photographic lens 3. The CCD 20 photoelectrically converts and outputs electrical signals (image signals) corresponding to the light image of the subject resolved via the photographic lens 3.

Vertically below the LCD 6, four cylindrical batteries (such as AA dry cell batteries) 21 are arranged in a row. Electrical power accumulated in the batteries 21 is supplied to various parts of the electronic camera 1. Further, the charge necessary for emitting light by the light emitting part 4 is accumulated in a condenser 22, which is aligned with the batteries 21.

Various control circuits in a circuit board 23 control various parts of the electronic camera 1. Further, a removable memory card (storage medium) 24 can be between the circuit board 23 and the LCD 6 (battery 21). Various types of information input into the electronic camera 1, are recorded in respective preset regions of the memory card 24.

Although in this embodiment the memory card 24 is removable, memory or alternative information storage mediums may also be provided in the circuit board 23 to record various types of information. Further, the information recorded in the memory card 24 can be output to an external personal computer for external storage or use via an interface (not shown).

Figure 4:
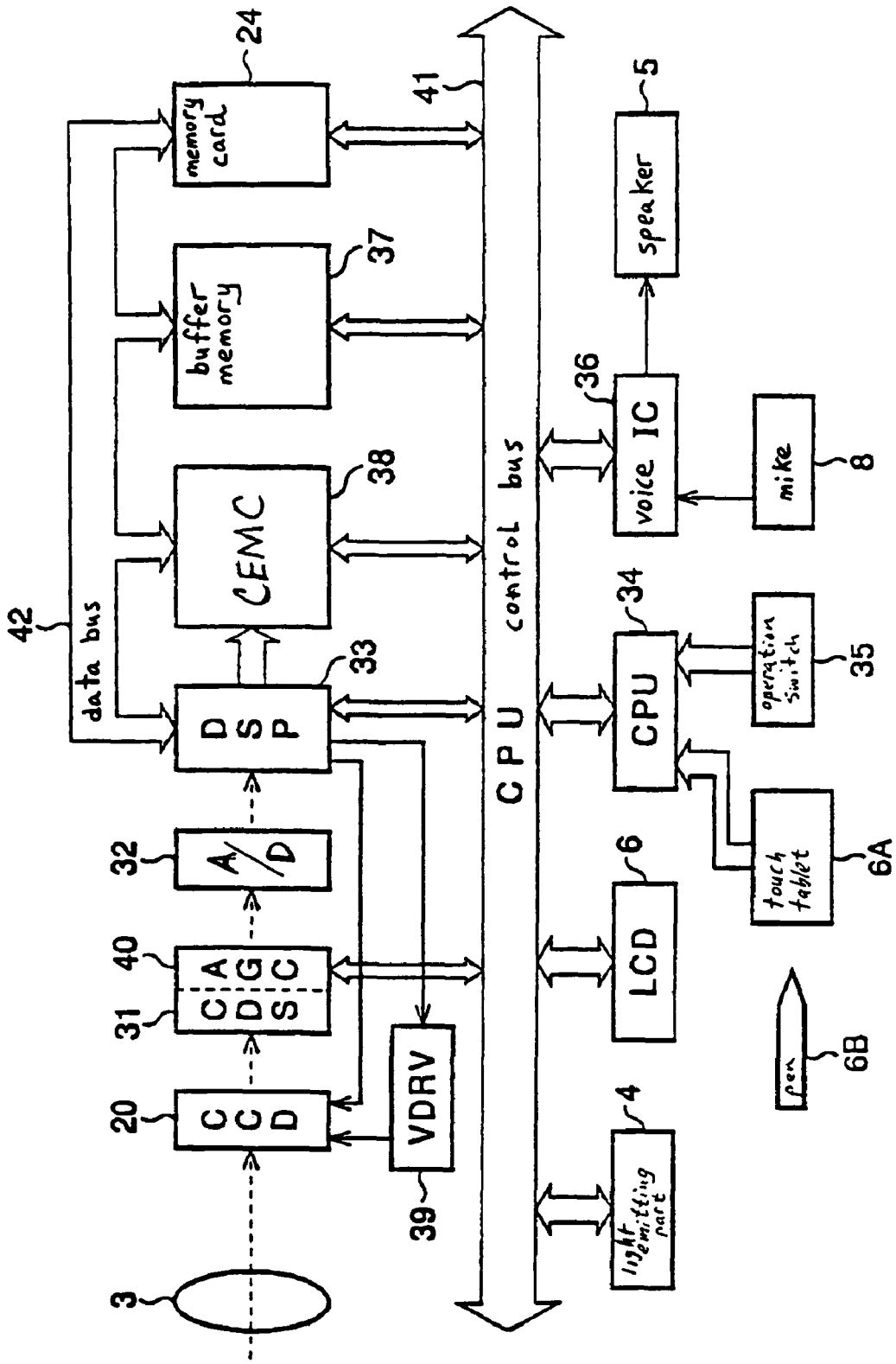
FIG. 4 shows a block diagram of an electrical composition of the electronic camera of FIG. 1.

Next, an electrical composition of the electronic camera 1 is explained with respect to FIG. 4. The CCD 20 is equipped with a plurality of pixels. The CCD 20 photoelectrically converts the light image, which is resolved into respective pixels, into image signals (electric signals). A digital signal processor DSP 33 controls a CCD drive circuit (VDRV) 39 to drive the CCD 20.

A correlation duplex sampling (CDS) circuit 31 samples the image signals photoelectrically converted by the CCD 20 in a prescribed timing. An automatic gain control circuit (AGC) 40 controls the gain of the signal sampled by the CDS 31. An analog/digital (A/D) conversion circuit 32 digitizes the image signals sampled by the CDS circuit 31 and supplies them to the DSP 33.

The DSP 33 supplies the digitized image data to a buffer memory 37 where it is stored. A compression and expansion memory control (CEMC) circuit 38 reads out the image data stored in the buffer memory 37. After being compressed by the Joint Photographic Experts Group (JPEG) method, (described below) the image data read by the CEMC circuit 38 is supplied to the memory card 24 via a data bus 42, and recorded in a predetermined image recording region.

Image data header information such as the photograph date/time information are recorded in the image recording region of the memory card 24. That is, the photographic date/time data is added to the image data recorded in the image recording region of the memory card 24.

The mike 8 inputs sound such as voice, and supplies a corresponding voice signal to a voice IC 36. The voice IC 36 converts the voice signals into digitized voice data. After compression, the digitized voice data is supplied to the memory card 24 where it is recorded in a predetermined sound or voice (hereafter sound) recording region. At this time, voice data header information such as the voice (sound) recording date/time data is recorded in the sound recording region of the memory card 24.

A CPU 34 is preferably implemented on a special purpose computer, a programmed microprocessor or microcontroller and peripheral integrated circuit elements, an ASIC or other integrated circuit elements, a hardwired electronic or logic circuit such as a discrete element circuit, a programmable logic device such as a PLD, PLA, FGPA or PAL, or the like. In general, any device on which a finite state machine capable of implementing the flowchart shown in FIG. 3 can be used to implement the CPU 34. The CPU 34 has an installed clock circuit (not shown). The light emitting part 4 is controlled by the CPU 34. The light emitting part 4 emits light in a controlled timing to illuminate the subject.

When a prescribed portion of the touch tablet 6A is pressed by the pen 6B operated by the user, the CPU 34 reads the X-Y coordinates corresponding to the position of the touch tablet 6A. The CPU 34 accumulates that coordinate data, which can be "line-drawn information" (described below). The CPU 34 supplies the line-drawn information accumulated in a memory (not shown) with header information such as the date/time information of line-drawn information to the memory card 24. The line-drawn information and header is recorded into the line-drawn information recording region.

The buffer memory 37 and the LCD 6 are connected to the CPU 34 via a CPU control bus 41. The image corresponding to the image data stored in the buffer memory 37 can be displayed on the LCD 6. However, the compression processed image data is input first to the CEMC circuit 38. After being expanded, from the CEMC circuit 38 the compression processed image data is supplied to the buffer memory 37 via the data bus 42.

The speaker 5 is connected to the voice IC 36. The voice data read out by the memory card 24 is expanded by the voice IC 36. After being converted to analog voice signals, the voice data are output from the speaker 5.

An operation switch 35 corresponds to the release switch 10, the power source switch 11, the recording switch 12, and the continuous shooting mode changeover switch 13, as shown in FIGS. 1-3. When each switch is operated, a corresponding signal is supplied to the CPU 34 and the CPU 34 executes a corresponding predetermined process.

Next, operation of the electronic camera according to this embodiment is described. First, a voice input/output process is described. As shown in FIG. 1, when the power source switch 11 is changed to "ON", power is supplied to the electronic camera 1. When the (sound) recording switch 12 is pressed, a sound recording process begins. The sound recording process inputs and records performing voices or the like. In this manner, the voice input via the mike 8 is converted to digital voice data by the voice IC 36. After compression, the compressed data is supplied to the memory card 24 and recorded in the sound recording region of the memory card 24. At this time, data such as the recording date/time of the voice data is also recorded as compressed voice data header information in the sound recording region of the memory card 24. This operation can be repetitively executed when the sound recording switch 12 is pressed. Moreover, the Pulse Code Modulation (PCM) method, which is known to one of ordinary skill in the art, or another method may be used for voice compression.

Next, an operation for photographing the subject is described. First, the S mode for the continuous shooting mode changeover switch 13 (single frame photography) is described. As shown in FIG. 1, the power source switch 11 on the surface Y1 is changed to "ON" and power is supplied to the electronic camera 1. The subject is then confirmed in the finder 2. When the release switch 10 on the surface Y1 is pressed, the process of photographing the subject begins.

In the photography process, the light image of the subject observed through the finder 2 is gathered by the photographic lens 3 and resolved onto the CCD 20. The light image of the subject formed on the CCD 20 is photoelectrically converted to image signals on each pixel and sampled by the CDS circuit 31. After being gain controlled via the AGC circuit 40, the image signals sampled by the CDS 31 are supplied to the A/D conversion circuit 32. The digitized signals are then supplied to the DSP 33.

The DSP 33 supplies the digitized image data once to the buffer memory 37, where it is stored. The CEMC circuit 38 uses the JPEG method to compress image data read out from the buffer memory 37. The JPEG method combines cosine conversion scattering, quantizing and Huffman encoding as would be known to one of ordinary skill in the art. The CEMC circuit 38 supplies compressed image data via the data bus 42 to the memory card 24. The memory card 24 records the image data supplied from the CEMC circuit 38 to the image recording region. At this time, the date/time data of the photograph is recorded as the image data header information in the image recording region of the memory card 24.

Thus, when the release switch 10 is pressed in the S mode of the continuous shooting mode changeover switch 13, photography of one frame only is performed. Accordingly, even if the release switch 10 is depressed continuously in the S mode, photography is performed for one frame. Further, when the release switch 10 is continuously depressed for a prescribed time, the current image being photographed can be displayed on the LCD 6.

Next, the L mode for the continuous shooting mode changeover switch 13 (continuous photography of 8 frames per second) is explained. First, the power source switch 11 is changed to "ON" to supply power to the electronic camera 1. When the release switch 10 is pressed, the process of photographing the subject begins.

Light from the subject observed through the finder 2 is collected by the photographic lens 3, and formed on the CCD. The light image of the subject formed on the CCD 20 is photoelectrically converted to image signals in each pixel. The image signals are sampled at a rate of 8 times per second by the CDS circuit 31. At this time, the CDS circuit 31 can thin out or remove image electrical signals corresponding to ¾ of these pixels.

Remaining image signals (image signals of ¼ of the pixels of the CCD 20) sampled by the CDS circuit 31 are supplied to the A/D conversion circuit 32. The digitized signals are output to the DSP 33.

The DSP 33 supplies the digitized image initially to the buffer memory 37, where it is stored. The image data stored in the buffer memory 37 is read out and compressed using the JPEG method by the CEMC circuit 38. From the CEMC circuit 38, the compression processed image data is supplied to the memory card 24 via the data bus 42, and recorded to the image record region. At this time, the date/time data of the photographer are recorded as image data header information in the image recording region of the memory card 24.

Next, the H mode for the continuous shooting mode changeover switch 13 (continuous shooting at 30 frames per second) is explained. First, the power switch 11 is changed to "ON" to supply power to the electronic camera 1. When the release switch 10 is depressed, the subject photography process is initiated.

Light from the subject observed through the finder 2 is collected by the photographic lens 3, and resolved on the CCD 20. The light image of the subject resolved on the CCD 20 is photoelectrically converted to image signals in each pixel of the CCD 20. The image signals are sampled by the CDS circuit 31 at a rate of 30 times per second. At this time, the CDS 31 can thin out or remove image electrical signals corresponding to ⅘ of all of the pixels of the CCD 20.

Remaining image signals (image signals of one-ninth of all of the pixels) of the CCD 20 are supplied to the A/D conversion circuit 32. The digitized signals are output to the DSP 33.

The DSP 33 supplies the digitized image data once to the buffer memory 37, where it is recorded. The CEMC circuit 38 reads out the image data from the buffer memory 37 and performs JPEG compression. In this way, the digitized and compression processed image data is supplied to the memory card 24 via the data bus 42, and stored with the photographic date/time header information in the image recording region of the memory card 24.

Moreover, during photography of the subject, the light emitting part 4 is controlled by the CPU 34 as necessary to illuminate the subject with light.

Next, operation of the electronic camera 1 when pen-input information is input using the touch tablet 6A (two-dimensional information) is described. When the touch tablet 6A is contacted by the tip of the pen 6B, data corresponding to the contacted X-Y coordinate location is input to the CPU 34. Data corresponding to these X-Y coordinates is supplied to the CPU 34 and stored. Further, information related to a size of the contacting point can be recorded by the CPU 34 into a position corresponding to the X-Y coordinates in the buffer memory 37. Then, the size of the contacting point is displayed by the CPU 34 at a corresponding position on the LCD 6.

As described above, the touch tablet 6A formed on the surface of the LCD 6 is composed of a transparent material. Thus, the user can observe a point displayed on the LCD 6 at the position where the touch tablet 6A was pressed by the pen-tip of the pen 6B. In other words, the user can directly observe the pen 6B input on the LCD 6. Further, when the pen 6B is moved in contact with the touch tablet 6A, a line is displayed along the locus where the pen 6B moved on the LCD 6. Further, when the pen-type pointing device 6B moves continuously on the touch tablet 6A, a dotted line is displayed in accompaniment with the movement of the pen-type pointing device 6B on the LCD 6. In this manner, the user can input line-drawn information (described above) such as a desired character or figure.

In the event that an image is displayed on the LCD 6, when line-drawn information (e.g., characters) is input by the pen 6B, the line-drawn information and the image information is combined in the buffer memory 37 and displayed simultaneously on the LCD 6.

Moreover, the user can operate a color select switch (not shown) to select a color for the line drawing displayed on the LCD 6. The user can select a color from a plurality of colors such as black, white, red, and blue.

After input of the line-drawn information by the touch tablet 6A and the pen 6B, the execute key 7B of the operating keys 7 can be pressed. When the execute key 7B is pressed, the line-drawn information accumulated in the memory and the input date/time header information is supplied to and recorded in the image recording region of the memory card 24, via the CPU control bus 41.

The line-drawn information recorded in the memory card 24 can be compression processed. However, the line-drawn information input to the touch tablet 6A includes information having a high spatial frequency component and a total amount of information is comparatively small. When the JPEG method is used for such image compression, the compression efficiency is poor. Further, the JPEG compression method is non-reversible compression. Thus, the JPEG method is not as appropriate for compression of line-drawn information because the amount of information is small. Accordingly, when the line-drawn information is expanded and displayed on the LCD 6, gathering that accompanies the loss of information, as well as blurring and the like occurs because of the JPEG method.

Therefore, in this embodiment, line-drawn information is compressed by a run-length method. The run-length method is known to one of ordinary skill in the art and can be used for facsimile devices and the like. The run-length method is a method that compresses line-drawn information by scanning the line-drawn screen in the horizontal direction. Then, the run-length method encodes the continuing lengths of information (points) of each color, such as black, white, red, and blue, and the continuing lengths of non-information (sections with no pen input).

By employing the run-length method, line-drawn information can be efficiently compressed. Further, when the compressed line-drawing information is expanded, information loss can be suppressed. Alternatively, when the amount of line-drawn information is comparatively small, the information can be stored without compression.

If the image is displayed on the LCD 6 when the pen 6B input is performed, the image data and the pen 6B line-drawn information are combined in the buffer memory 37, and the composite image of the image and the line drawing is displayed on the LCD 6. However, in the memory card 24, the image data is recorded in the image recording region, and the line-drawn information is recorded in the line-drawn information recording region. In this way, the two types of information are recorded in different regions, respectively. As a result, the user is able to delete from the composite image either the image or the line drawing. Further, the respective types of image information can be compressed and recorded by individual methods of compression.

Figure 5:
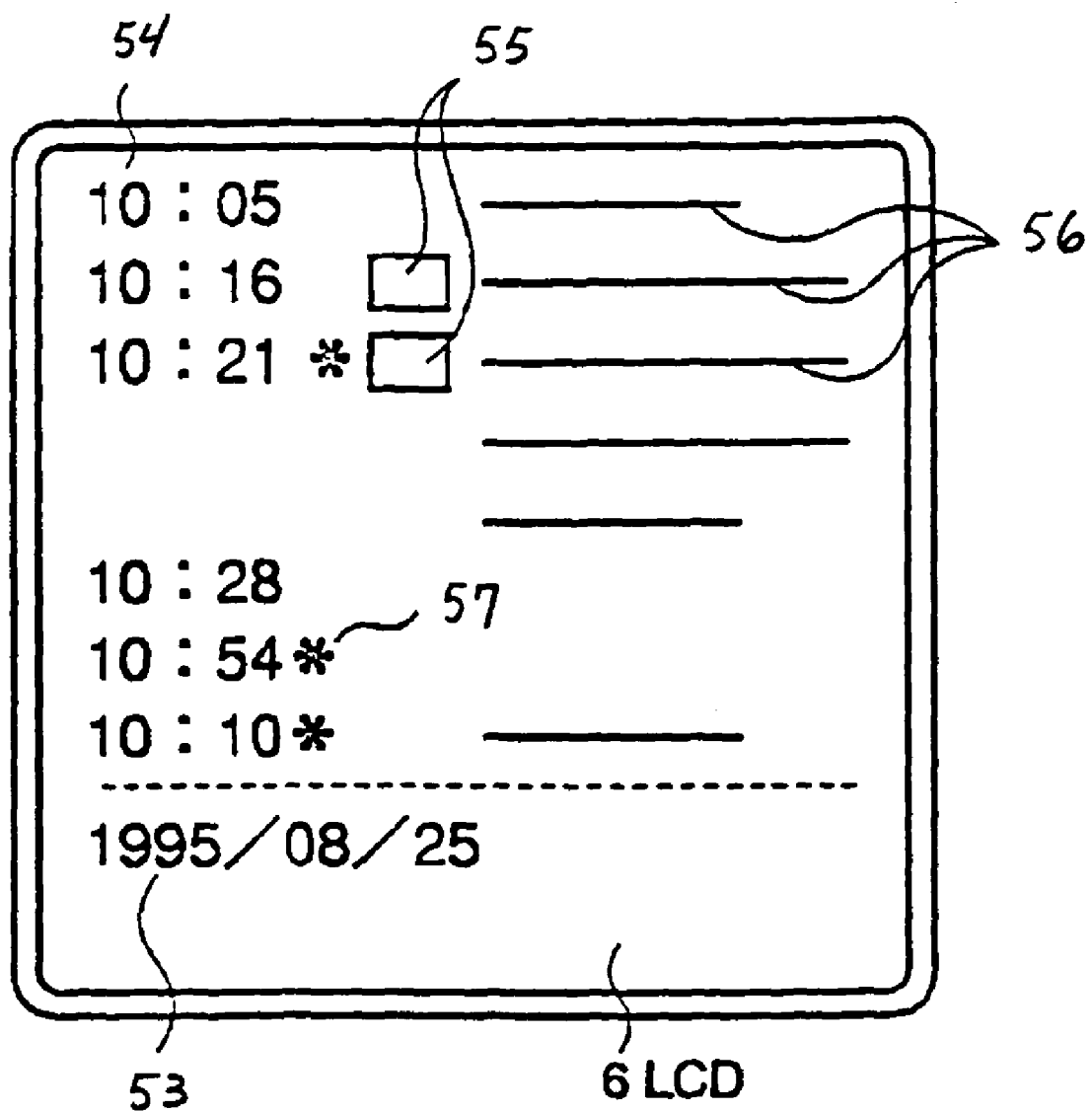
FIG. 5 shows a display screen displayed on an LCD of the electronic camera of FIG. 1.

If data is recorded the sound (hereafter voice) recording region, the image recording region, or the line-drawn information recording region of memory card 24, a "view display screen" displayed on the LCD 6 allows selection of the recorded information. On the view display screen of the LCD 6 as shown in FIG. 5, a date when the information was recorded (recording date) is displayed in a recording date display region 53 at the bottom of the LCD 6. The recording date reads "Aug. 25, 1995" in this case. The recording time of the information recorded on that recording date is displayed in a recording time display region 54 at the extreme left side of the LCD 6.

To the right side of the recording time, when image data is recorded, a thumbnail image is displayed in a thumbnail image display region 55. The thumbnail image is a reduced image created by thinning out bitmap data of the respective types of image data recorded in the memory card 24. Accordingly, the information displayed by the thumbnail image is information including image information. As shown in FIG. 5, information recorded (input) at the times "10:16" and "10:21" include image information. The information recorded at the times "10:05", "10:28", "10:54", and "10:10" do not include image information.

Further, a memo signal "*" indicates that the recorded information includes line-drawn information. The memo signal "*" is displayed in a memo symbol display region 57 on the LCD 6.

Adjacent to the right side of the thumbnail image display region 55, voice information bars 56 can be displayed. The displayed length on an existing bar (line) corresponds to the time the voice was recorded. If voice information was not recorded, the voice information bar is not displayed.

On a screen displayed on the LCD 6 as shown in FIG. 5, the user designates the information selected to be played back by pressing with the pen tip of the pen 6B. The user presses the pen 6B within the rectangular region where the desired information is displayed. Alternatively, playback of the selected information is designated by pressing the execute key 7B shown in FIG. 2 with the pen tip of the pen 6B. As a result of either action, the selected information is output.

For example, in FIG. 5, when the pen 6B presses in recording time display region 54 displaying 10:05, the CPU 34 commands the voice IC 36 to play back the voice corresponding to the selected recording time, "10:05".

The voice IC 36, reads out voice data from the memory card 24, executes the expansion process, converts the voice data to analog signals and outputs the voice recording from the speaker 5. If earphones (not shown) are connected to the earphone jack 9, voice is output from the earphones and/or the speaker 5.

To play back the image data recorded in the memory card 24, the user can press the desired thumbnail image with the pen 6B to select that information. Next, by pressing the execute key 7B, the user initiates playback of the selected information.

The image data corresponding to the selected thumbnail image is read out from the memory card 24 and expanded in the CEMC circuit 38. The expanded image data is stored as bitmap data in the buffer memory 37 via the data bus 42. Next, a control signal corresponding to the image data stored in the buffer memory 37 is supplied to the LCD 6 by the CPU 34 to display the corresponding image.

At this time, if voice data is also recorded (e.g., 10:16, 10:21), the voice recording is concurrently output from the speaker 5.

If the memory is fully loaded in the voice IC 36 or in the memory card 24, a corresponding sound effect can be predetermined. Also, when the operation switch 35 or the touch tablet 6A is operated, the voice IC 36 can output a predetermined sound effect. Further, when the release switch 10 is pressed, (i.e., similar to a conventional camera employing film) the sound of the shutter snapping (hereafter the "shutter sound effect") can be made to occur electrically. By the shutter sound effect, the user confirms that the image recording has been performed.

Figure 6:
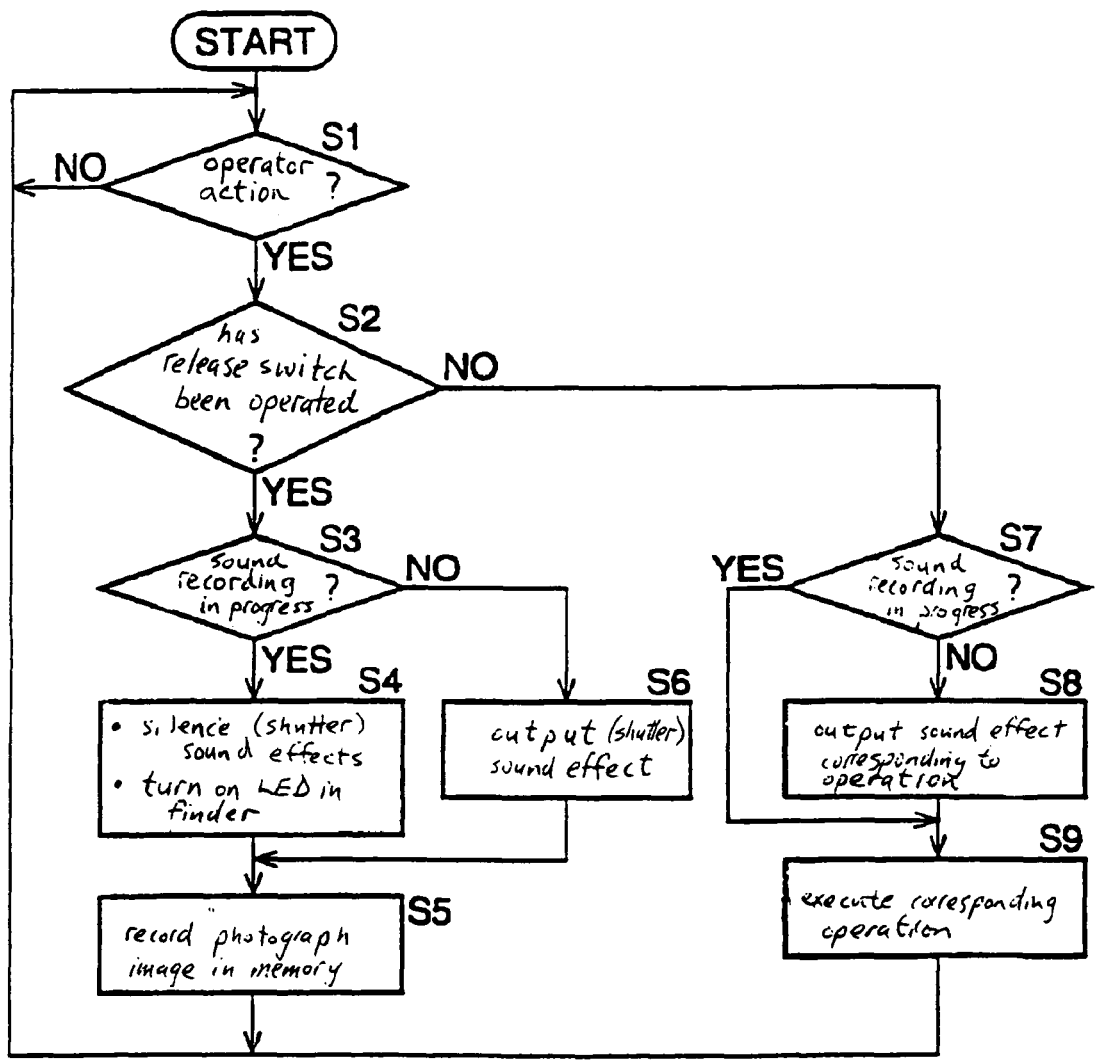
FIG. 6 shows a flow chart for the operation of the present invention applied to the electronic camera of FIG. 1.

Next, with respect to FIG. 6, a method of this embodiment to prevent the output of the shutter sound effect is described. When the recording switch 12 of the electronic camera 1 is operated for sound recording by the mike 8 in the event that the electronic camera 1 is used as a tape recorder, the release switch 10 can be operated. The method shown in FIG. 6 can prevent output of the shutter sound effect during photography of the photographic subject.

From the start of operations in FIG. 6, control advances to step S1. In step S1, it is judged whether the operation switch 35 or the touch tablet 6A have been operated. When the judgment is that the operation switch 35 or the touch tablet 6A have not been operated, control returns to step S1. In this way, the process of step S1 is repetitively executed. However, when the judgment in step S1 is that the operation switch 35 or the touch tablet 6A have been operated, control advances to step S2. In step S2, it is judged whether the release switch 10 has been pressed.

Figure 7:
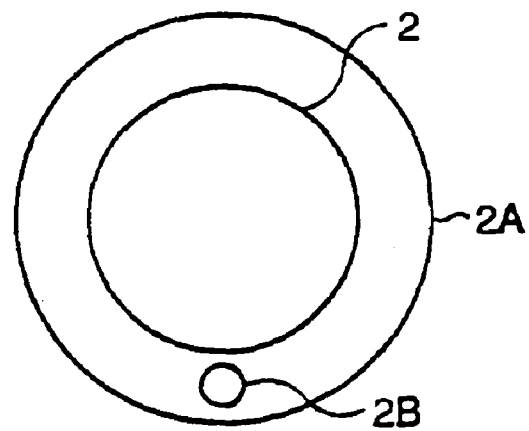
FIG. 7 shows a finder that includes a light-emitting diode.

In step S2, when the judgment is that the release switch 10 has been pressed, control advances to step S3. In step S3, it is judged whether voice is currently being recorded. When the judgment is that voice is currently being recorded in step S3, control advances to step S4 where the shutter sound effect is silenced (not output). As shown in FIG. 7, in one case when the shutter sound effect is silenced, a light-emitting diode 2B within an eyepiece 2A of the finder 2 is lit. In this case, an optical finder can be used. By this occurrence, the operation recording that image to the memory card 24 can be visually confirmed by the user.

Figure 8:
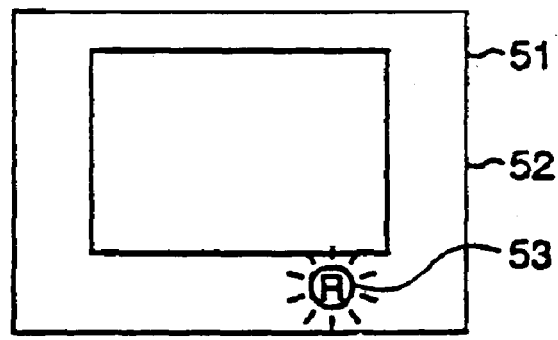
FIG. 8 shows a finder for a single lens reflex camera including a light-emitting diode.

Alternatively, in the case of single lens reflex, a light-emitting diode 53 on the outer side of a screen 52. As shown in FIG. 8, the screen 52 displays the image of the subject within a finder 51. When the judgment in step S3 is that voice recording is not in progress, control advances to step S6. In step S6, the shutter sound effect is output via the speaker 5 or the like. Thus, the user can aurally and visually confirm initiating the image photography operation.

From step S6 and step S4, control advances to step S5. The photographed image is recorded to the memory card 24 in step S5. After that, control returns from step S5 to step S1 so that the process can be repetitively executed from step S1.

In step S2, when the judgment is that the release switch 10 has not been operated, control advances to step S7. In step S7, it is judged whether voice is currently being recorded. When the judgment is that voice is being recorded, the output of the sound effect corresponding to the operation (see step S1) is not performed. In this case, control advances to step S9. When it is judged step S7 that voice is not being recorded, control advances to step S8 where the prescribed sound effect corresponding to the operation is output. From step S8, control advances to step S9. In step S9, the corresponding operation is executed. From step S9, control returns to step S1 so that the process can be respectively executed.

As described above, when recording voice, the shutter sound effect or other sound effects output are interrupted. Thus, it is possible not to record the shutter sound effect or the sound effects to the memory card 24 with the voice.

Figure 13:
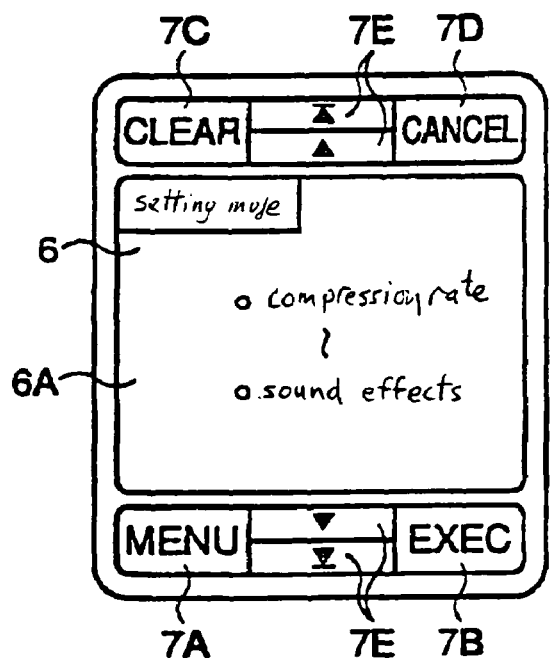
FIG. 13 shows a setting mode selection screen.
Figure 14:
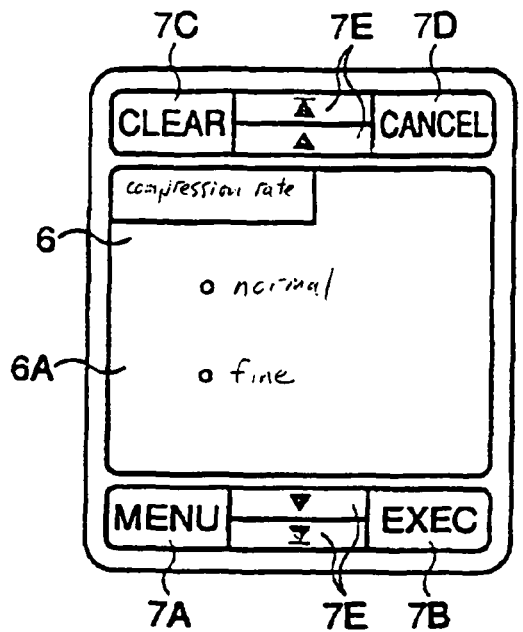
FIG. 14 shows a compression rate setting screen.

As described above, the compression/expansion memory control circuit 38 uses the JPEG method to compress the photographed image to be recorded in the memory card 24. In that case, this compression rate is variable and can be set by the user as shown in FIGS. 13 and 14. For example, the compression of the photographed image can be set to $\frac{1}{20}^{th}$ of the data amount (i.e., a normal mode) or to $\frac{1}{10}^{th}$ of the data amount (i.e., fine mode).

The shutter sound effect output when the release switch 10 is operated can be changed to indicate the current compression rate set for the electronic camera 1. For example, when the release switch 10 is operated in the normal mode, a comparatively low frequency sound is output. When the release switch 10 is operated in the fine mode, a comparatively high frequency sound is output. Of course, the volume or tone of the corresponding sound may be altered. As a result, the user can aurally and visually confirm the release switch 10 operation and the current compression rate setting.

Figure 9:
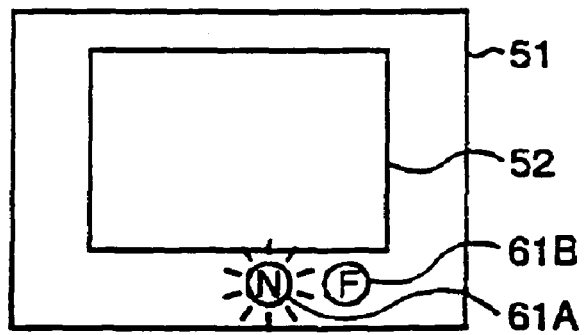
FIG. 9 shows the finder of FIG. 8.

Further, when the release switch 10 operates during voice recording, the shutter sound effect is prevented. Instead, a light-emitting diode 61A within the finder 51 can emit light to illuminate a character such as "N", (normal) to indicate the normal compression rate mode to the user as shown in FIG. 9. A light-emitting diode 61B can emit light to illuminate a character such as "F" (fine) for the fine compression rate mode. As a result, the user can visually confirm the release switch 10 operation and the current compression rate setting.

Figure 10:
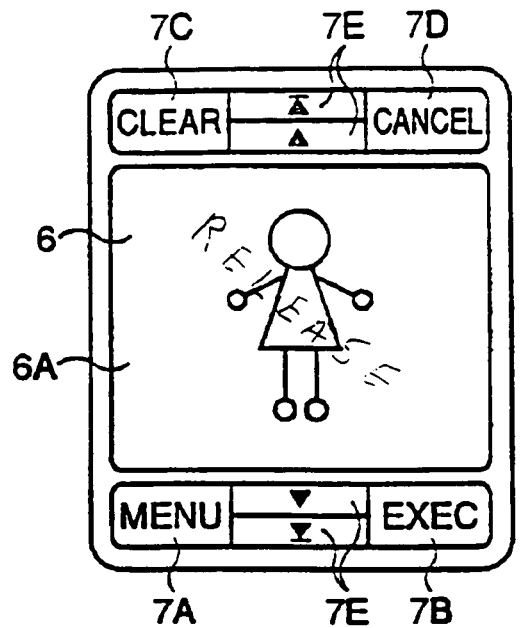
FIG. 10 shows an LCD during operation of a release switch.

Alternatively, the release switch 10 actuation can cause the display of a word such as "release" on the LCD 6 as shown in FIG. 10. Again, the user visually confirms the release switch 10 operation. Further, when the release switch is operated, a word (character), picture, or the like corresponding to the current compression rate can be displayed with "release" on the LCD 6. As a result, the user visually confirms the release button 10 operation, and the current compression rate.

Next, operations that set the compression rate and the shutter sound effect (release sound) are explained with reference to FIGS. 11-17. As shown in FIG. 11, the pen 6B selects the menu key 7A on the touch tablet 6A to display a menu selecting screen. The selecting screen is displayed on the LCD 6. On an exemplary selection screen shown in FIG. 12, selected items such as "recording mode", "playback mode", "personal information mode", "calendar display mode" and "setting mode" are displayed. When the pen 6B selects the "setting mode" selection item, settable items are displayed in an exemplary setting selection screen as shown in FIG. 13.

Among the settable items in FIG. 13, for example, a "compression rate" item can be selected. Selecting the compression rate item displays an exemplary compression rate setting screen shown in FIG. 14. Selecting "normal" in the compression rate setting screen with the pen 6B sets the compression rate to the normal mode. Selecting "fine" with the pen 6B sets the compression rate to the fine mode.

Figure 15:
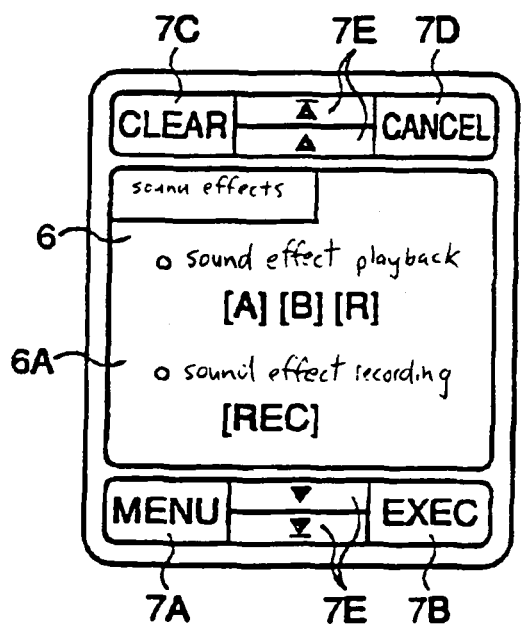
FIG. 15 shows a sound effect setting screen.

Selecting the item "sound effect" in the setting selection screen of FIG. 13 with the pen 6B displays a sound effect screen. As shown in FIG. 15, selecting the character A or B of the item "release sound playback 'A', 'B', 'R'" displays a prescribed sound effect A or the character B, respectively. With the character R, (described below) a voice recorded by the user can be displayed. Accordingly, selecting A, B or R sets the corresponding sound effect to be output when the release switch 10 is operated.

Figure 16:
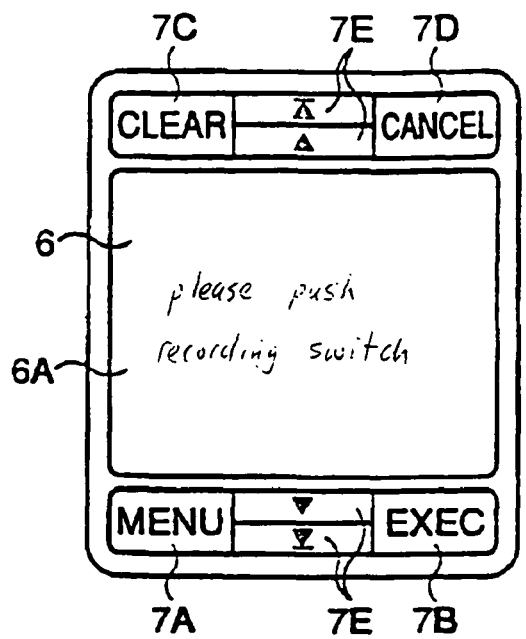
FIG. 16 shows a message displayed during selection.
Figure 17:
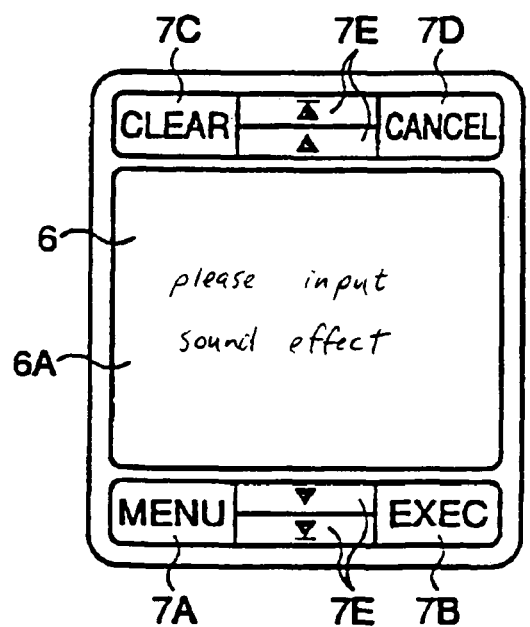
FIG. 17 shows a message displayed during release sound recording.

Further, when selecting the item "release record sound 'REC'" in the sound effect screen with the pen 6B displays the message "Please press recording switch" on the LCD 6 as shown in FIG. 16. When the user operates the recording switch 12, the message "Please input release sound" is displayed as shown in FIG. 17. Next, the user inputs with the mike 8 a recording to be the release sound. The voice input from the mike 8 is compressed in the voice IC 36 and recorded in a prescribed region in the memory installed in the voice IC 36 or the memory card 24. In this manner, the user can record a voice recording as the release sound.

As a result, selecting "R" in the sound effect setting screen of FIG. 15, allows the user to input and record the prescribed voice recording. The voice recording set as the release sound is subsequently output as the release sound when the release switch 10 is operated.

Figure 12:
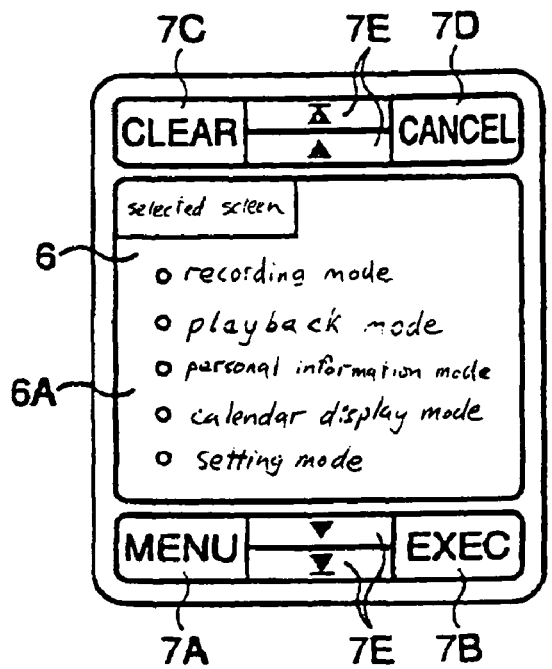
FIG. 12 shows a selection screen.

As shown in FIG. 12, the electronic camera 1 includes modes such as the following:
  information input mode (recording mode);
  information playback mode (playback mode);
  personal information process mode;
  calendar display mode; and
  setting mode.

The "record mode", is the mode recording in the memory card 24, for example, the input of image information, voice information, text information, line-drawn information or the like. The "playback mode" is the mode playing back information recorded in the memory card 24 such as image information, voice information, text information, or line-drawn information. The personal (individual) information mode is a mode for reviewing previously input personal information (for example, friends' telephone numbers and addresses and the like) or for inputting of new personal information. The calendar display mode is a mode creating a predetermined calendar display, and subsequently reviewing it. With regard to the setting mode, as described above, it is a mode setting the compression rate, setting the sound effect, setting the operation of the strobe by changing the default value corresponding to the photographic environment of the electronic camera 1 and the like.

When the operation switch 35 or the touch tablet 6A is operated by the user, a sound effect corresponding to the current mode of the electronic camera can be output. For example, several types of sound effect data can be pre-stored in the voice IC 36 or the memory card 24. When the operation switch 35 or the touch tablet 6A are operated, the voice IC 36 reads out from memory the sound effect corresponding to the current mode of the electronic camera 1 and outputs it from the speaker 5.

Further, the length, the frequency, the strength or the tone of the corresponding sound effect in each mode can be changed. Further, various combinations of these may be changed. For example, if a 700 Hz "pi" sound is output for the "recording mode", a 350 Hz "pu" sound (i.e., a frequency one octave lower) can be output in the "playback mode". Further, in the case of the "personal information mode", a 1400 Hz "pin" sound is output. For the "calendar display mode", a 1400 Hz "kaan" sound is output, and for the "setting mode", a 700 Hz "po" sound is output.

By automatically changing the sound effect output when the touch tablet 6A or the operation switch 35 are operated, the user can identify each mode. Further, camera operation mistakes are reduced because the user can aurally identify the mode currently being used even when the electronic camera 1 is operated in a dark location.

Further, the release sound (shutter sound effect) output when the release switch 10 is operated can be based on the mode set by the continuous shooting mode changeover switch 13. For example, when the continuous shooting H mode is set and the release switch 10 is depressed, a release sound of a comparatively high frequency is output. When the continuous shooting L mode is set, a release sound of a comparatively low frequency is output. Further, when the continuous shooting S mode is set, a release sound of an even lower frequency is output. As a result, the user operating the release switch 10 can aurally identify the continuous shooting mode that is currently set.

Figure 18:
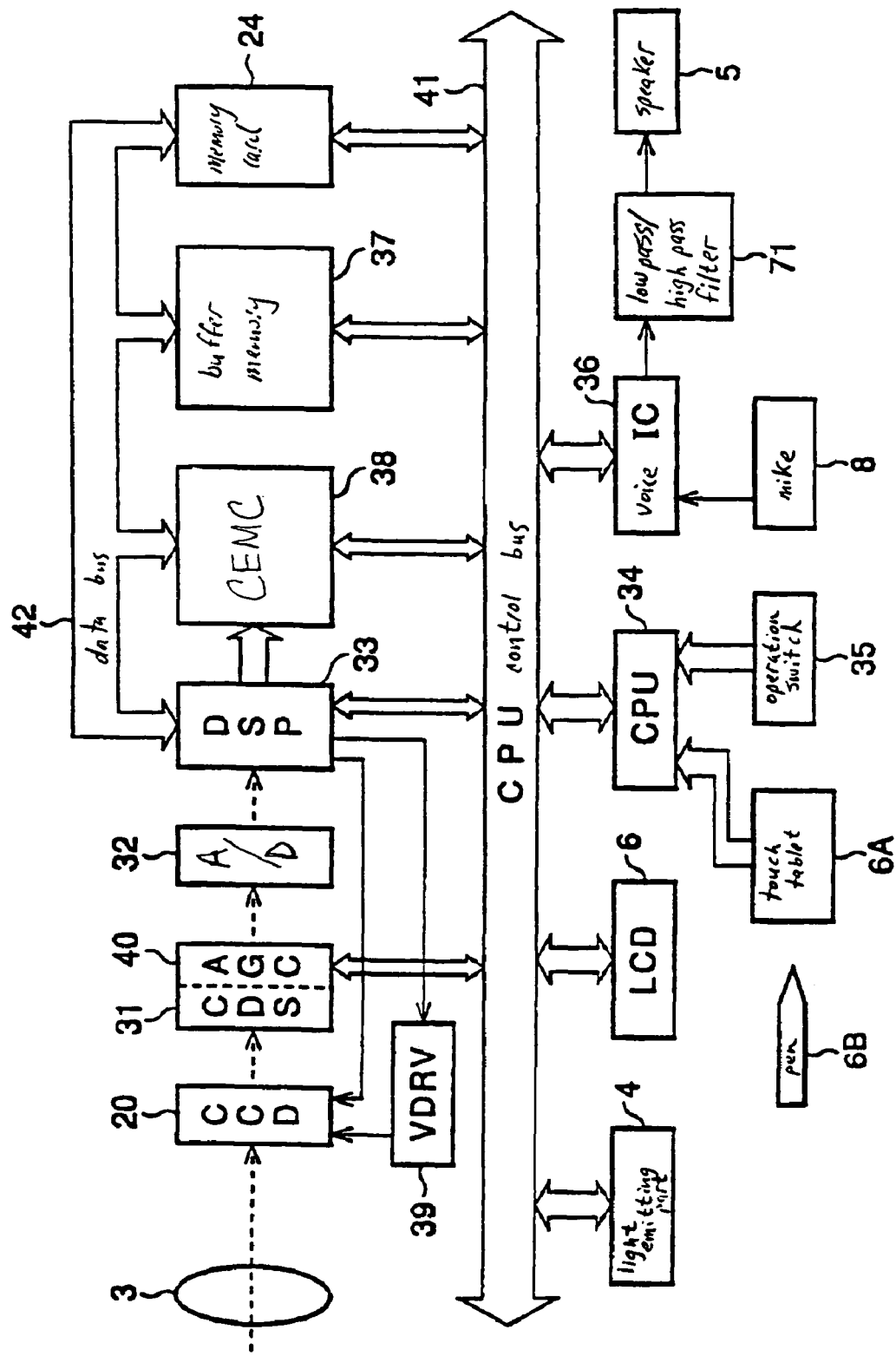
FIG. 18 is a block diagram showing another electrical composition of the electronic camera according to the present invention.

FIG. 18 is a diagram of another embodiment of an electronic camera of the present invention. In this embodiment, between the voice IC 36 and the speaker 5, a low pass/high pass filter 71 is provided. Remaining features of the composition and operation are similar to the embodiment of FIG. 4. Thus, a detailed, explanation of those features is omitted here.

The low pass/high filter 71 can be operated to interrupt the signal of a predetermined high frequency signal and a predetermined low frequency signal from the voice signal output from the voice IC 36. For example, a sound effect having a frequency that is 30 Hz lower or 10 kHz higher than common voice frequency can be interrupted by the filter 71. The low pass/high pass filter 71 using a signal interrupting function with a frequency equal to or below 30 Hz and a frequency equal to or higher than 10 kHz can interrupt such sound effects output from the voice IC 36. As a result, the sound effect signals are blocked and only voice signals will be output from the speaker 5.

FIG. 19 is a diagram of the electrical composition of yet another embodiment of the present invention. In this embodiment, addition calculators 81, 82, inverter 83, and oscillator 84 have been provided.

The addition calculator 81 inputs the voice signal output by the voice IC 36 and the signal corresponding to a prerecorded sound effect output from the oscillator 84. The addition calculator 81 then supplies an added signal to the speaker 5. The addition calculator 82 adds the voice and sound effect input from the microphone 8 with the signal supplied from the inverter 83, and supplies it to the voice IC 36. The oscillator 84, which is controlled by the CPU 34, produces a sound effect of a prescribed frequency.

For example, when the touch tablet 6A or the operation switch 35 are operated, a corresponding sound effect of a prescribed frequency is output from the oscillator 84. A signal corresponding to a prescribed sound effect output from the oscillator 84 is supplied to the addition calculator 81 and the inverter 83. The addition calculator 81 supplies the signal, to the speaker 5, and the prescribed sound effect is output from the speaker 5.

The signal corresponding to the prescribed sound effect is supplied to the inverter 83, where its phase is reversed and supplied to the adding calculator 82. The sound effect output from the peripheral voice through the speaker 5 is input to the microphone 8. Also, the input sound effect, and the signal input from the inverter 83 (with the reverse phase of the sound effect phase), are added. This lowers the sound effect signal level. In other words, the sound effect level included in the signal supplied to the voice IC 36 from the adding calculator 82 is lowered. As a result, recording the sound effect can be limited or prevented in the memory card 24.

In the embodiment shown in FIG. 4, the voice data corresponding to the voice input from the mike 8 (sound effect is also included when sound effect is output from the speaker 5) is recorded with a record start time $T_S$ to the memory card 24. When the operation switch 35 or the touch tablet 6A are operated during voice recording, the voice IC 36 produces the prescribed sound effect and a time of the sound effect $T_K$ is recorded in the memory card 24 or the like. From these times $T_S$ and $T_K$, an absolute time is produced by the clock circuit provided in the CPU 34.

Also, when the voice data recorded in the memory card 24 is played back by the voice IC 36, the time $T_S$ and the time $T_K$ are read out by the CPU 34. Then, the time L corresponding to this difference $(T_K-T_S)$ is determined. When the time L only has been surpassed from the voice playback, the CPU 34 first produces reverse phase wave-formed data from the sound effect produced by the voice IC 36. After the voice data has been superimposed, it is output from the speaker 5. Accordingly, the sound effect signal level in the voice playback can be lowered.

In this case, the time the sound effect was produced by the voice IC 36, the time it is output from the speaker 5, and the time it was input to the microphone 8 are assumed to be simultaneous for simplicity of description. If a time lag exists, the timing can be collected by the CPU 34 from the reverse phase wave-formed data. As a result, the sound effect level included in the voice played back and output from the speaker 5 can be lowered.

Further, a sound effect having a frequency outside a frequency range capable of recording or playback can be selected. For example, when a voice signal of a frequency equal to or above 10 kHz is not supplied from the IC 36 to the memory card 24, the frequency of the sound effect can be selected to be equal to or higher than 10 kHz. Further, when a voice signal of a frequency equal to or below 30 Hz is not supplied from the IC 36 to the memory card 24, the frequency of the sound effect can be selected to be equal to or lower than 30 Hz. As a result, recording the sound effect to the memory card 24 can be prevented.

In the above embodiments, the finder 2 is an optical object, but a crystal finder using crystal may also be used. Further, a light-emitting diode is provided in the finder. When the light-emitting diode is lit, for example, information such as the release switch operation is visually made known to the user. However, the embodiments are not limited to this. A crystal may be provided within the finder to make the prescribed information known to the user.

Further, the above-described embodiments use only one microphone. However, it is possible to provide two microphones, to the left and right, so that voice can also be recorded in stereo.

The above embodiments can also use earphone detection devices to detect that earphones are connected to the earphone jack 9. In the event earphones are connected, even during voice recording, the sound effect can be output from the earphones. The sound effect broadcast by the earphones does not reach the mike 8 and is not recorded. Beneficially the user can still confirm the sound effect by earphones.

The above embodiments use a pen-type pointing device to input each type of information. However, touch by a finger or the like can also be used.

Furthermore, the invention is not limited to the display screen displayed on the LCD 6. Various screen layouts can be used. Similarly, the invention is not limited to the type or layout of the operating keys.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An information input apparatus, comprising:
a monitor by which a subject is observed;
an imaging device that forms digital images of the subject;
a sound recording device that inputs sounds during a recording mode;

a storage medium that stores the digital images formed by the imaging device and the sounds input by the sound recording device;

a release button that initiates start of a process of forming the digital images by said imaging device;

a customizable sound selection device capable of customizing a preset sound effect by user selection;

a sound effect output device that outputs the customized preset sound effect when the release button initiates the process of forming the digital images; and a controller coupled to the sound recording device, the storage medium, and the sound effect output device;

wherein while in the recording mode, the controller controls the sound effect output device to prevent outputting of the customized preset sound effect, and controls the monitor to indicate visual information that the process of forming a digital image is started instead of issuing the customized preset sound effect when the release button is actuated by a user.

2. The information input apparatus of claim 1, further comprising a setting device that sets one compression rate among a plurality of compression rates for the images formed by the imaging device, wherein a frequency of the customized preset sound effect corresponds to the compression rate set by the setting device.

3. The information input apparatus of claim 2, wherein the setting device further sets an information input apparatus operating mode, wherein the customized preset sound effect corresponds to the operating mode set by the setting device.

4. The information input apparatus of claim 1, wherein the sound effect output device selects and outputs the customized preset sound effect with a frequency incapable of being input by the sound recording device, incapable of being stored by the storage medium, or incapable of being played back by a sound playback device.

5. The information input apparatus of claim 1, wherein the controller includes a prevention device that prevents the output of frequencies that are lower or higher than a common voice frequency.

6. The information input apparatus of claim 5, wherein the prevention device includes a filter.

7. The information input apparatus of claim 1, wherein the controller includes a prevention device that prevents the recordation of the customized preset sound effect by use of a reverse phase of a preset sound effect phase.

8. The information input apparatus of claim 7, where the prevention device includes an inverter.

* * * * *